United States Statutory Invention Registration [19]

[11] Reg. Number: H451

Pinnell [43] Published: Apr. 5, 1988

[54] FRAMELESS TRANSPARENCIES FOR AIRCRAFT COCKPIT ENCLOSURE

[75] Inventor: William R. Pinnell, Dayton, Ohio

[73] Assignee: The United States of America as represented by the Secretary of the Air Force, Washington, D.C.

[21] Appl. No.: 805,008

[22] Filed: Dec. 4, 1985

[51] Int. Cl.[4] ..... B64C 1/10

[52] U.S. Cl. ..... 244/121; 244/129.3

[58] Field of Search ..... 244/129.3, 121, 122 AF; 52/200, 208, 308; 428/38

[56] References Cited

U.S. PATENT DOCUMENTS

| | | | |
|---|---|---|---|
| 2,258,724 | 10/1941 | Wagner et al. | 20/40 |
| 2,511,168 | 6/1950 | Martin et al. | 154/43 |
| 2,637,076 | 5/1953 | Bolte | 20/40 |
| 3,618,881 | 11/1971 | Fellers | 244/121 |
| 4,004,388 | 1/1977 | Stefanik | 52/398 |
| 4,081,581 | 3/1978 | Littell, Jr. | 428/138 |
| 4,464,192 | 8/1984 | Layden et al. | 428/902 |
| 4,504,341 | 3/1985 | Radzwill et al. | 244/129.3 |
| 4,580,745 | 4/1986 | Brophy | 244/122 AF |

*Primary Examiner*—Deborah L. Kyle
*Assistant Examiner*—Michael J. Carone
*Attorney, Agent, or Firm*—Fredric L. Sinder; Donald J. Singer

[57] ABSTRACT

A frameless aircraft cockpit enclosure comprising transparent panels of polycarbonate or other plastics of varying thickness and material properties. The edges of the transparent panels are made thicker than the rest of the panels to engage aircraft canopy and windshield arch sections and aircraft sill structures to thus eliminate prior art frames and edge reinforcements. Fibers may be embedded in the thicker edges to add strength. The material properties of the transparent panel may be varied to provide higher static load strength near aircraft sill structures and higher dynamic load strength and plastic behavior near the center of a canopy where bird impact may occur. The material properties of the panel may also be varied to minimize over a pilot's head or near aircraft critical equipment the amplitude of a flexure wave in an aircraft transparency resulting from a bird impact. Direct forming methods, such as injection molding, are discussed as a means for making the frameless aircraft transparencies.

2 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FRAMELESS TRANSPARENCIES FOR AIRCRAFT COCKPIT ENCLOSURE

RIGHTS OF THE GOVERNMENT

The invention described herein may be manufactured and used by or for the government of the United States for all governmental purposes without payment of any royalty.

BACKGROUND OF THE INVENTION

The present invention relates generally to aircraft transparencies, or windshields and canopies, and more particularly to frameless transparencies.

Transparent cockpit enclosures for fighter and trainer type high performance aircraft typically comprise a plurality of aircraft transparencies. The transparencies comprise curved transparent panels surrounded by frames providing both structural support and means for attaching the transparencies to aircraft sill structures. The frames are usually fabricated of metal or a matrix of high strength fibers, and are attached to the transparent panels by bonding agents or fasteners.

Large discontinuities in material properties exist at the panel and frame boundaries, creating design complications for structurally withstanding the dynamic loading associated with bird impact. Rows of bolt holes near transparent panel edges in most transparancies weaken the panels in that critical structural area. The panel and frame design requices pressure seals at both the panel and frame interface and at the frame and aircraft sill structure interface. Stresses occur in the transparent panels due to frame installation and differential thermal expansion. These stresses lead to structural deficiencies, optical distortions and limited durability. The frames themselves are generally made of metals such as magnesium, having high static strength, but brittle in response to dynamic loads such as bird strikes.

U.S. Pat. No. 1,004,388 to Stefanik discloses a common approach in use today for the problems accompanying panel and frame design. Stefanik teaches overlapping the edges of a transparent panel with uncured laminated fiberglass strips, then curing the strips under heat and pressure to form rigid connecting members firmly secured to the transparent panel. These reinforced plastic edge reinforcements are then drilled for attachment to a metal frame which attaches to the aircraft sill structure.

Prior art attempted solutions toward producing a "frameless" transparency include U.S. Pat. No. 2,511,168 to Martin. et al., which teaches cementing a mounting strip into a slot formed inside the transparent panel edges. The mounting strip is formed of the same plastic as the transparent panel, but reinforced by impregnated layers of metal wire or screen. The reinforced strip is fastened into slots or other fastening locations on the aircraft sill structures. Martin adds sufficient additional mechanical structure to prevent the structure from being truly frameless and does not allow opening and closing for pilot ingress and egress without the addition of a separate frame.

U.S. Pat. No. 2,637,076 to Bolte describes an outer frame of intersecting ribs and spars of transparent plastic cemented and reinforced with transparent tape. Bolte does not describe a sill attachment structure.

U.S. Pat. No. 2,258,721 to H. Wagner. et al. teaches forming the edges of the transparent panels into pear-shaped beads to fit within correspondingly shaped recesses in the aircraft sill structures. This design creates a "step" between the outside of the sill structure and the transparent panel, preventing a smooth aerodynamic transition from the outside of the sill structure to the transparent panel. Wagner does not allow opening and closing for pilot ingress and egress without the addition of a separate frame.

U.S. Pat. No. 4,081,581 to Littell discloses a laminated windshield design wherein the inside laminations extend beyond the windshield edges to allow placement of bolt holes for attachment. Littell teaches that, while the bolt holes are primarily for use in attaching the windshield to test apparatus, they may possibly be used for direct attachment of windshields to aircraft. However, as with the other prior art structures thus far described, the use of this design in canopies, which generally have to structurally support hinges and latches for opening to allow pilot ingress and egress, still will require edge reinforcements and a frame.

Acrylic plastics have been the most often used material for transparent panels in the past. Acrylics offer light weight and good formability, but are typically too brittle to resist bird impact or to be used without a frame. The recent introduction of tougher polycarbonate and other plastics for their bird impact resistance offers the possibility of using that toughness to build frameless transparencies. The mere substitution of modern plastics for acrylic, however, is not sufficient, as indicated by the recognition in Littell, describing a polycarbonate laminate, of the continued need for edge reinforcements and frames.

Polycarbonate transparencies in use today are made from layers of thin polycarbonate sheets laminated with intervening layers of elastomeric resin. Curved transparencies are generally made by bending and forming extruded flat sheets of plastic under heat and pressure. Applied to thicker polycarbonate panels, this process results in unpredictable physical properties. Laminating thinner sheets solves that problem, but limits the design options available, thus preventing successful utilization of polycarbonate toughness for aspects of transparency design other than for bird strike protection.

Elimination of transparency frames will save cost, complexity and weight. It will minimize the required inventory of parts and fasteners. It will enhance flight safety by improving bird impact resistance and will lower manufacturing costs. It will reduce transparency change-out time and cost. It will reduce corrosion problems related to transparency frames and fasteners. It will minimize structural discontinuities at the transparency and frame interface, providing a wealth of as yet unanticipated advantages.

It is, therefore, a principal object of the present invention to provide an improved frameless transparency.

Another object of the present invention is to provide an improved monolithic transparency.

Yet another object of the present invention is to provide a frameless transparency that provides for canopy opening and closing relative to the aircraft sill structure.

A further object of the present invention is to provide a transparency that reduces the required number of fasteners and parts.

These and other objects of the present invention will become apparent as the detailed description of certain representative embodiments proceeds.

SUMMARY OF THE INVENTION

In accordance with the foregoing principles and objects of the present invention, a novel aircraft cockpit enclosure is described which uses transparent panels, at least one edge of the transparent panels terminating in a first area of thicker cross-section, the first thicker area being progressively thicker along substantially one side of the panels and terminating in a lip extending from the thicker side, whereby the first thicker area engages an arch section of the cockpit enclosure; and, at least one edge of the transparent panel terminating in a second area of thicker cross-section, the second thicker area being substantially progressively thicker along substantially one side of the panels, whereby the second thicker area engages the aircraft sill structure. This embodiment also includes means for attaching the cockpit enclosure to an aircraft sill structure, including hinging means for pivotally connecting the cockpit enclosure to the aircraft. The embodiment further includes shaping the transparency second area of thicker cross-section to cooperate with the aircraft sill section to provide an aerodynamically smooth outer surface. Another modification to this embodiment includes imbedding fibers in the thicker edge sections.

Yet another embodiment of the invention uses a transparent panel of varying material properties, specifically including the thicker panel edges. A different embodiment provides that the transparent panel have a higher static load strength and less plastic behavior near aircraft sill structures, and a higher dynamic load strength and more plastic behavior near its center.

DESCRIPTION OF THE DRAWINGS

The present invention will be more clearly understood from a reading of the following detailed description in conjunction with the accompanying drawings wherein.

DETAILED DESCRIPTION

Figure 1:
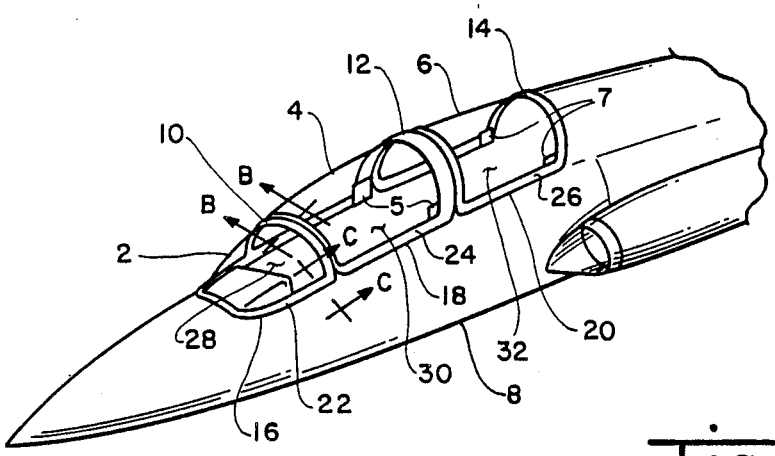
Fig. 1 PRIOR ART
FIG. 1 is a perspective view of a prior art transparency windshield and canopies.

Referring now to FIG. 1 of the drawings, there is shown a perspective view of a prior art transparency windshield and canopies. The transparency comprises a windshield 2 and two canopy sections 4 and 6 mounted on an aircraft 8. The windshield 2 and the canopies 4 and 6 meet at arch sections 10, 12, and 14. The windshield 2 and the canopies 4 and 6 meet the aircraft 8 at the sill sections 16, 18 and 20 through frames 22, 24 and 26 which surround transparent panels 28. 30 and 32. Canopies 4 and 6 are hinged at the rear through hinges 5 and 7 to allow pilot or aircrew member ingress and egress. Other designs provide hinges along the canopy frame sides. Additionally, many rear hinged designs include hinges along the frame sides to minimize bending moments that might otherwise be transmitted to relatively brittle acrylic transparency panels from the aircraft sill structure.

Figure 2:
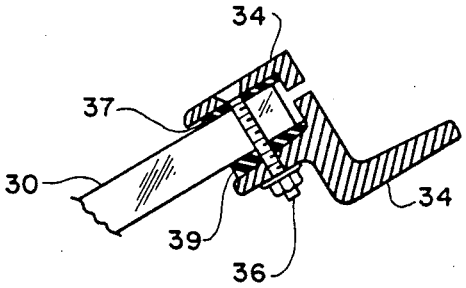
Fig. 2 PRIOR ART
FIG. 2 is a cross-sectional view along line B—B of FIG. 1 of a prior art transparency windshield arch section.

FIG. 2 is a cross-sectional view along line B—B of FIG. 1 of a prior art transparency windshield arch comprising a transparent panel 30 attached to a metal frame 34 by bolts 36 or rivets through rows of holes drilled in the transparent panel 30. Elastomeric sealing strips 38 and 39 are used to provide a positive pressure seal between transparent panel and frame.

Figure 3:
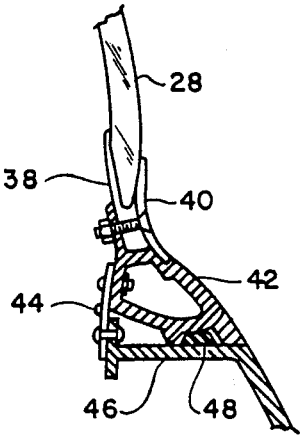
Fig. 3 PRIOR ART
FIG. 3 is a cross-sectional view along line C—C of FIG. 1 of a prior art transparency windshield sill section.

FIG. 3 is a cross-sectional view along line C—C of FIG. 1 of a prior art transparency windshield sill section comprising a transparent panel 28, edge reinforcement 38, a fairing 40, and a metal frame 42. A hinge 44 connects the frame 42 to the aircraft sill structure 46. The hinge 44, working in conjunction with an inflatable elastomeric seal 48, provides the necessary flexibility to the windshield aircraft connection to prevent cracking of brittle prior art acrylic windshields.

The advantages of modern polycarbonate plastics may be used to the fullest extent, without the design limitations of lamination, by direct forming of the transparency. Direct forming, as in, for example, injection molding or pressure molding, allows variation of the thickness and shape of the transparency over its area. Direct forming also allows variation of material properties over the area of the transparency by, for example, injecting additives as the mold is filled and varying the cooling rate at different portions of the mold. Reinforcing fibers can be embedded during the molding process.

Varying the material properties of the transparency over its area allows matching material properties, for example, static load strength and dynamic load strength, to those portions of transparencies subject to those loadings. For instance, high static load strength is desired near the aircraft sill structure to handle the attachment loads. Also, that portion of the transparency should have low plasticity for minimal deformation. The center or top of a canopy undergoes very low static loads, but is subject to very high dynamic loadings from bird impact. High dynamic load strength combined with high plasticity to absorb energy is an advantage in those areas. Varying material properties will also allow transparent panels that minimize near a pilot's head or near critical equipment the amplitude of a flexure wave resulting from bird impact, a process thus far attempted only by varying the thickness of the transparency panel.

Direct forming further allows molded-in place attachment sites for hinges, latches and other connectors. The attachment sites may include imbedded rods, bolt anchors, hooks, bosses and cavities.

Figure 4:
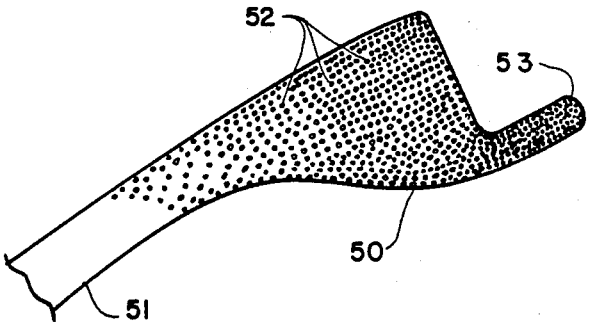
FIG. 4 is a cross-sectional view of a transparency windshield arch section according to the present invention.

FIG. 4 is a cross-sectional view of a transparency arch section according to the present invention. The arch section comprises a thicker edge section 50 of an aircraft transparent panel 51. The thicker edge section 50 becomes progressively thicker, substantally along one side of the panel, and terminates in a lip 53. The arch section 50 may further comprise embedded high strength fibers 52 to provide added strength to the arch section.

Figure 5:
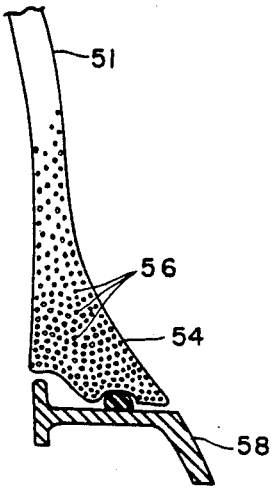
FIG. 5 is a cross-sectional view of a transparency sill section according to the present invention.

FIG. 5 is a cross-sectional view of a transparency canopy sill section according to the present invention. The sill section comprises a thicker edge section 54 of the aircraft transparent panel 51. The thicker edge section 54 becomes substantially progressively thicker, substantially along one side of the panel. Sill section 54 sits upon aircraft sill structure 58. No side hinges for opening and closing are required on this rear hinged canopy. And, no side hinges for reducing bending moments are required because of the added toughness of the present invention transparency. The sill section 54 may further comprise embedded high strength fibers 56 to provide added strength to the sill section.

Figure 6:
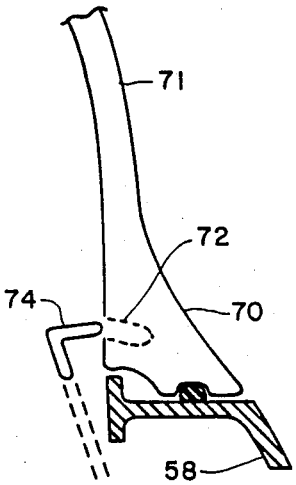
FIG. 6 is a cross-sectional view of a transparency sill section according to the present invention showing an example of means for attaching a canopy to an aircraft sill section.

FIG. 6 is a cross-sectional view of a transparency sill section according to the present invention showing an example of means for attaching a canopy to an aircraft sill section. It comprises a thickened edge section 70 of an aircraft transparent panel 71 similar in shape to that shown in FIG. 5. A slot 72 is molded into the plastic to receive the lip 74 of an overcenter latch mounted to the inside of the aircraft sill structure 58.

FIGURES 4, 5, and 6 are embodiments of the present invention adapted for retrofitting on existing aircraft. Removing the requirement of a separate transparency frame on future aircraft will lead to other embodiments which take advantage of the increased flexibility in shape afforded by the absence of a frame. For instance, sill structures in future aircraft may be designed to allow the transparency to maintain a constant thickness from center to edge. And, arch sections of connecting transparencies may be designed to nest one into the other to present a more aerodynamically smooth shape than is possible with retrofit structures.

It is understood that certain modifications to the invention as described may be made, as might occur to one with skill in the field of this invention, within the intended scope of the claims. Therefore, all embodiments contemplated hereunder have not been shown in complete detail. Other embodiments may be developed without departing from the spirit of this invention or from the scope of the claims.

I claim:

1. A cockpit enclosure for an aircraft having a cockpit sill structure, comprising:

(a) at least one jointless and seamless frameless transparent panel having edges shaped to mate with the cockpit sill structure; and, (b) wherein the material properties of the panel vary over its area so that the amplitude of a flexure wave caused by an impact on the panel is minimized at one or more preselected locations on the panel.

2. A cockpit enclosure according to claim 1, wherein the frameless transparent panel has a higher static load strength and less plastic behavior near the edges, and has a higher dynamic load strength and more plastic behavior away from the edges.

* * * * *